United States Patent [19]
Bleitz et al.

[11] Patent Number: 5,893,589
[45] Date of Patent: Apr. 13, 1999

[54] FLUID CONDUIT CONNECTING APPARATUS

[75] Inventors: Daniel J. Bleitz, Wixom; Luigi Mastrofrancesco, Livonia; Clarke Fisk Thacker, Farmington Hills, all of Mich.

[73] Assignee: Ford Motor Company, Dearborn, Mich.

[21] Appl. No.: 08/889,071

[22] Filed: Jul. 7, 1997

[51] Int. Cl.6 .................................................. F16L 27/00
[52] U.S. Cl. ...................... 285/184; 285/148.19; 285/179; 285/382
[58] Field of Search ................................ 285/184, 179, 285/382, 146.19

[56] References Cited

U.S. PATENT DOCUMENTS

| | | | |
|---|---|---|---|
| 1,125,642 | 1/1915 | Blanchard | 285/184 X |
| 2,116,004 | 5/1938 | Tear | 285/184 X |
| 2,176,295 | 10/1939 | Creveling | 285/184 X |
| 3,064,998 | 11/1962 | Syverson | 285/184 X |
| 4,673,010 | 6/1987 | Prufer et al. . | |
| 4,762,343 | 8/1988 | Hirohata | 285/184 X |
| 5,112,085 | 5/1992 | Busch et al. . | |
| 5,170,752 | 12/1992 | Binversi et al. | 285/184 X |
| 5,586,791 | 12/1996 | Kirchner et al. | 285/184 X |

*Primary Examiner*—Dave W. Arola
*Attorney, Agent, or Firm*—Gregory P. Brown

[57] ABSTRACT

A fluid conduit connecting apparatus allows various final assembly orientations of the fluid supply line (52) to a pump housing (16). The fluid conduit connecting apparatus includes a collar (12) having a first side (22) with teeth (26) and a tube (14) with at least one tooth (60) for orienting the tube (14) relative to the collar and housing when finally installed. The tube (14) further includes at least one retaining barb (82) for positively retaining the tube (14) in a fluid passage (72) of the housing (16).

8 Claims, 2 Drawing Sheets

FLUID CONDUIT CONNECTING APPARATUS

BACKGROUND OF THE INVENTION

1. Field of the Invention

This invention relates generally to fluid conduit connectors for interconnecting two fluid conduits. More particularly, the present invention relates to a fluid conduit connector that can be readily assembled into a variety of angular orientations.

2. Disclosure Information

Hydraulic pumps, such as a power steering pump, receive hydraulic fluid from a reservoir through a fluid conduit. This permits the reservoir to be remotely located from the pump, in turn allowing the pump to be located as close to the engine driving the pump as possible. The relationship of the hydraulic pump to the engine changes with each application. Correspondingly, the reservoir location and the fluid conduit communicating fluid from the reservoir to the pump may also change with each different application. Presently, each of these changes necessitates the design and manufacture of a unique connector to interconnect the fluid conduit from the reservoir to a housing of the hydraulic pump.

It would therefore be desirable to provide a single fluid conduit connecting apparatus capable of interconnecting a fluid conduit to a pump housing from a variety of orientations resulting from varying the location of the engine, pump and reservoir to one another.

SUMMARY OF THE INVENTION

According to the present invention, a fluid conduit connecting apparatus has been discovered which permits a single connector to be used in a variety of assemblies requiring different orientations between the fluid supply and the associated housing. Accordingly, the fluid conduit connecting apparatus includes a collar having an aperture therethrough and a plurality of teeth disposed around a periphery of the aperture and projecting axially outward from a first side of the collar.

The connecting apparatus also includes a tube having an exterior surface and an interior surface forming a fluid communication path extending between first and second ends of the tube. The tube also includes at least one tooth extending radially from the exterior surface of the tube for engagement with the plurality of teeth on the collar when the tube is inserted in the aperture of the collar. The tube further includes at least one retaining barb on the first end of the tube, the barb being adapted to retain the tube within the fluid passage of the housing.

The connecting apparatus also includes a sealing member disposed on the exterior surface of the tube between the first end and the tooth, the sealing member being adapted to sealingly engage a fluid passage within the housing.

Advantageously, the retaining barb maintains both the positive engagement of the teeth on the collar with the tooth on the tube as well as retaining the collar against the housing to provide the positive orientation of the connecting apparatus relative to the pump and the fluid conduit once installed.

DETAILED DESCRIPTION OF THE PREFERRED EMBODIMENT

Figure 1:
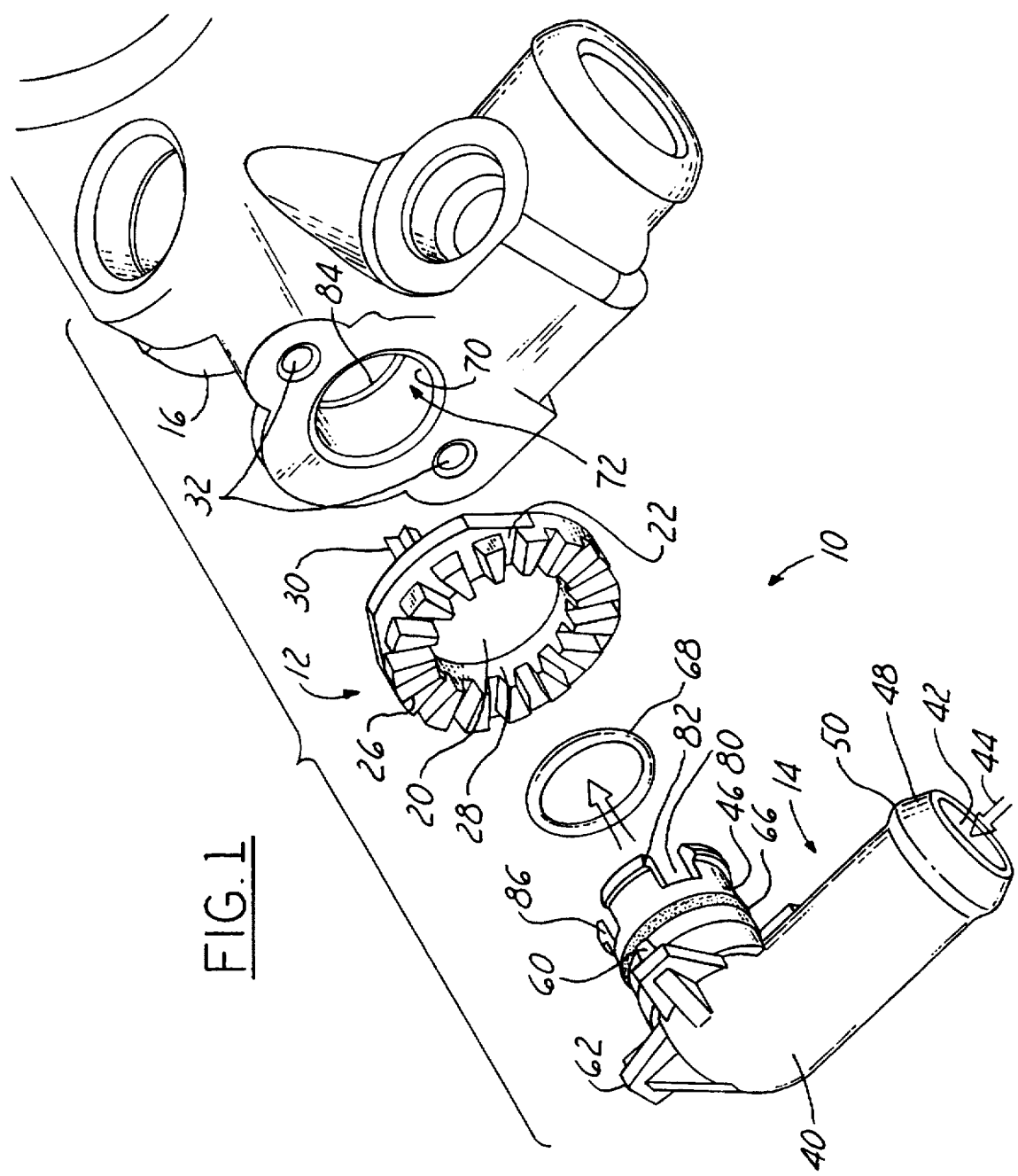
FIG. 1 is an exploded view of a fluid conduit connecting apparatus and a hydraulic pump housing constructed in accordance with the present invention.
Figure 2:
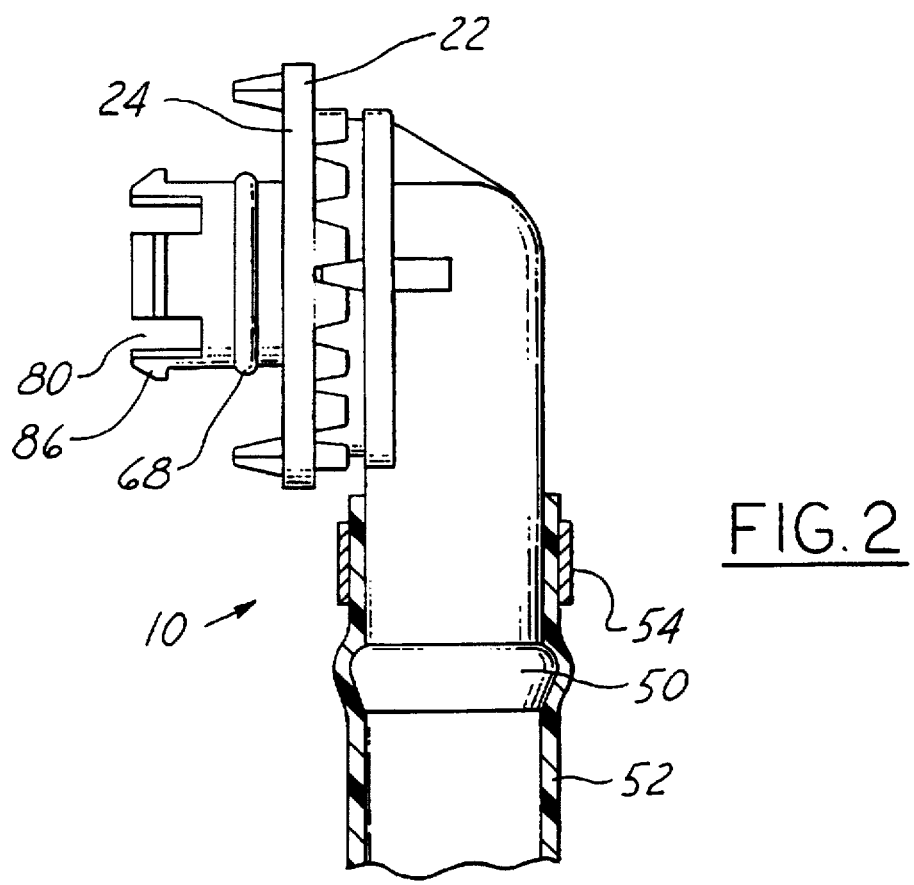
FIG. 2 is a partially sectioned view of a fluid conduit connecting apparatus and a hydraulic pump housing in accordance with the present invention.

Referring now to FIGS. 1 and 2, a fluid conduit connecting apparatus 10 includes a collar 12 and a tube 14 for installation into a housing 16 for a power steering pump as found on motor vehicles. It should be recognized that the present invention will be described in relation to a power steering pump, however, the advantages of the present invention apply to any assembly where flexibility of final assembly orientation is desired.

The collar 12 includes an aperture 20 sized to permit the tube 14 to slip therethrough. The collar 12 also includes first and second sides 22, 24. The first side 22 includes a plurality of teeth 26 located around the periphery 28 of the aperture 20 and projecting outwardly from the first side of the collar. The number of teeth 26 is a matter of design choice, depending on the desired number of orientations of the tube relative to the collar. In the presently preferred embodiment there are 16 teeth providing orientations every twenty two and a half degrees.

The second side 24 of the collar 12 may include provisions for engaging the housing 16 to prevent rotations of the collar 12 relative to the housing 16 once installed. Presently a pair of protuberances 30 project outwardly from the second side of the collar for insertion in a pair of mating bores 32 in the housing 16. For assembly purposes it is desirable if there is an interference fit between the protuberances 30 and the bores 32, such that the collar can be pressed onto the housing and remain there without the tube being installed. This may be accomplished by tapering either the mating bore or the protuberance, or for even greater retention providing a barbed end on the protuberance with a matching groove inside the mating bore (not shown).

The tube 14 includes an exterior surface 40 having various retaining features molded therein and an interior surface 42 forming the communication path 44 extending between first and second ends 46, 48. The second end of the tube includes a conventional nipple 50 for sealingly engaging a flexible fluid line and clamp assembly.

The exterior surface 40 includes at least one tooth 60 extending radially outward therefrom for engaging the plurality of teeth 26 on the collar. The location of the tooth 60 from the first end 46 is primarily determined by the desired installation depth as well as orientation requirements. If more than one tooth 60 is required to provide sufficient torque capacity, they must be spaced to mate with the teeth 26 on the collar. Installation depth will be affected if the tooth 60 bottoms with the teeth 26 during installation, which may or may not be desired.

Figure 3:
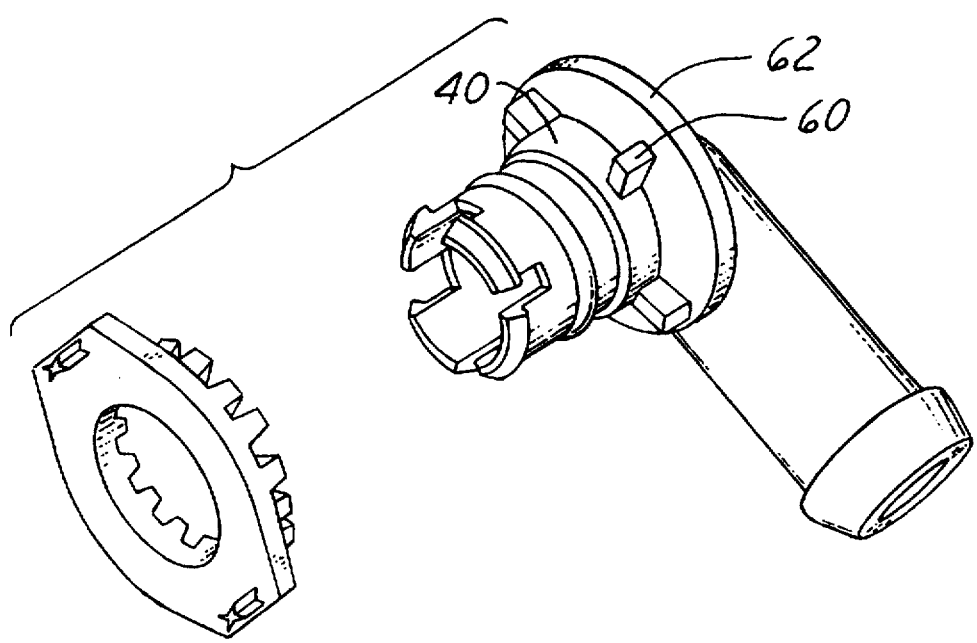
FIG. 3 is elevational view of an alternative embodiment of a fluid conduit connecting apparatus and a hydraulic pump housing constructed in accordance with the present invention.

Installation depth may also be controlled by providing a shoulder 62 behind the tooth 60. The shoulder 62 shores up the tooth 60 while also providing a stop upon which the teeth 26 will contact upon inserting the tube 14 into the collar a predetermined distance. Referring to FIG. 3, an alternative shoulder 62' is shown that completely surrounds the exterior surface 40, which provides additional strength when multiple teeth 60 are desired to react high torque loading on the tube 14.

Referring back to FIGS. 1 and 2, the exterior surface 40 of the tube 14 also includes a channel 66 for positioning and retaining a sealing member 68, such as an elastomeric O-ring. The sealing member 68 and channel 66 are located along the tube 14 between the first end 46 and the tooth 60. It should be recognized that it might be desirable to use a sealing member 68 with a garter spring (not shown) or some equivalent for retention to eliminate the need for the channel 66. The sealing member 68 has a larger outer diameter than diameter of the interior surface 70 of the fluid passage 72 in the housing 16 so as to sealing engage therewith.

The first end 46 of the tube 14 also includes a notch 80 and retaining barb 82 to positively retain the tube 14 within the fluid passage 72 of the housing 16. The retaining barb, which projects radially outward from the exterior surface of the tube, is adapted to snap into retaining channel 84 formed a predetermined distance within the fluid passage 72. The barb 82 may include a chamfered leading edge 86 to reduce the insertion efforts. A single retaining barb 82 may be used or alternatively a plurality may be used. The notch 80 further reduces the installation efforts by making it easier to deflect the barb portion of the tube as the barb is forced through the fluid passage 72. In the presently illustrated embodiment the notches 80 consist of U-shaped cutouts alternating between the retaining barbs 82. It should be recognized that similar functionality may be provided by various shaped relief cuts in the tube end, as well as by providing a channel (not shown) at the base of the retaining barbs 82 to facilitate their deflection.

The collar 12 and tube 14 of the present invention may be constructed from a variety of rigid plastic materials, such as reinforced polymers or glass filled nylons, or any other material having similar properties capable of fulfilling the intended purpose as disclosed herein. Advantageously, these materials are lighter and require less manufacturing time than machined metals made to the same specification.

Installation of the illustrated embodiment of the invention includes lightly pressing the collar 12 onto the housing 16, in the predetermined orientation established by the protuberances 30. Subsequently, the first end 46 of the tube 14, with or without the fluid line 52 attached thereto, is inserted through the aperture in the collar and into the fluid passage of the housing 16. With the tube in the desired orientation, the tube is pressed in until the retaining barbs positively engage the retaining channel 84. Each of the steps described are preferably carried out by a programmable articulated assembly tool, so that changes in orientation only require the tool to change the orientation of the tube as it is installed. All of the components remain common both for different vehicles and as vehicles evolve.

The foregoing description presents a the preferred embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A fluid conduit connecting apparatus for connecting a fluid conduit to a housing, said connecting apparatus comprising:
 a collar having an aperture therethrough and a plurality of teeth disposed around a periphery of said aperture and projecting axially outward from a first side of said collar;
 protuberance means projecting outward from a second side of said collar for retaining and preventing relative movement of said collar on the housing;
 a tube having an exterior surface and an interior surface forming a fluid communication path extending between first and second ends of said tube;
 at least one tooth extending radially from said exterior surface of said tube for engagement with said plurality of teeth on said collar when said tube is inserted in said aperture of said collar;
 sealing means disposed on said exterior surface of said tube between said first end and said tooth, said sealing means for sealingly engaging a fluid passage within the housing; and
 barb means disposed on said first end of said tube, said barb means for retaining said tube within said fluid passage of the housing.

2. A fluid conduit connecting apparatus according to claim 1, wherein said protuberance means includes a protuberance tapered to form a press fit retaining relationship with a mating bore located on the housing.

3. A fluid conduit connecting apparatus according to claim 1, wherein said tube further includes a shoulder spaced from said first end of said tube adjacent to and supporting said at least one tooth on said tube, said shoulder being operative to limit insertion of said tube relative to said aperture of said collar.

4. A fluid conduit connecting apparatus according to claim 1, wherein said first end of said tube further includes notch means disposed in said first end of said tube adjacent to said barb means for reducing efforts necessary to deflect said barb means.

5. A fluid conduit connecting apparatus according to claim 1, wherein said sealing means includes an elastomeric O-ring disposed in a channel formed in said exterior surface of said tube between said first end and said tooth.

6. A fluid conduit connecting apparatus for connecting a hydraulic conduit to a housing of a power steering pump on a motor vehicle, said connecting apparatus comprising:
 a collar having an aperture therein and a plurality of teeth disposed around a periphery of said aperture and projecting outward from a first side of said collar;
 protuberance means projecting outward from a seconds side of said collar for retaining and preventing relative movement of said collar on the housing;
 a tube having an exterior surface and an interior surface forming a fluid communication path extending between first and second ends of said tube;
 at least one tooth extending radially from said exterior surface of said tube for engagement with said plurality of teeth on said collar when said tube is inserted within said aperture of said collar;
 an elastomeric O-ring disposed in a channel formed in said exterior surface of said tube between said first end and said tooth;
 a plurality of notches disposed in said first end of said tube; and
 barb means disposed in said first end of said tube for matingly engaging a retaining channel of a fluid passage located within the housing of the steering pump.

7. A fluid conduit connecting apparatus according to claim 6, wherein said protuberance means includes a protuberance tapered to form a press fit retaining relationship with a mating bore located on the housing.

8. A fluid conduit connecting apparatus according to claim 6, wherein said tube further includes a shoulder spaced from said first end of said tube adjacent to and supporting said at least one tooth on said tube, said shoulder being operative to limit insertion of said tube relative to said aperture of said collar.

* * * * *